(12) United States Patent
Sierra Murillo

(10) Patent No.: US 10,897,990 B2
(45) Date of Patent: Jan. 26, 2021

(54) SUPPORT STAND FOR HANDS FREE USE OF ELECTRONIC DEVICES WHILE USING AN EXERCISE MACHINE

(71) Applicant: Carlos Alberto Sierra Murillo, Bogota (CO)

(72) Inventor: Carlos Alberto Sierra Murillo, Bogota (CO)

(*) Notice: Subject to any disclaimer, the term of this patent is extended or adjusted under 35 U.S.C. 154(b) by 0 days.

(21) Appl. No.: 16/840,509

(22) Filed: Apr. 6, 2020

(65) Prior Publication Data
US 2020/0323339 A1 Oct. 15, 2020

Related U.S. Application Data

(63) Continuation-in-part of application No. 16/378,972, filed on Apr. 9, 2019, now Pat. No. 10,690,282.

(51) Int. Cl.
*F16M 11/06* (2006.01)
*F16M 11/26* (2006.01)
(Continued)

(52) U.S. Cl.
CPC .......... *A47B 23/06* (2013.01); *A63B 71/0619* (2013.01); *F16M 11/10* (2013.01);
(Continued)

(58) Field of Classification Search
CPC ........ F16M 11/06; F16M 11/08; F16M 11/10; F16M 11/28; F16M 13/022;
(Continued)

(56) References Cited

U.S. PATENT DOCUMENTS 4,576,377 A * 3/1986 Wolff ................. A63B 23/0355
482/113
5,209,695 A * 5/1993 Rothschild ............. A63H 11/10
367/197

(Continued)

FOREIGN PATENT DOCUMENTS

EP 2729727 5/2014
NL 1033114 6/2008

*Primary Examiner* — Tan Le
(74) *Attorney, Agent, or Firm* — Defillo & Associates, Inc.; Evelyn A. Defillo

(57) ABSTRACT

A support stand for an electronic device including a flat base, a first post having a first end secured to the base, a second post having a first end pivotably connected to a second end of the first post, a platform pivotably connected to a second end of the second post, a first arm pivotably attached to the first post, the first arm having a first telescopic section extending away from the first post, a second arm pivotably attached to the first post, a second arm having a second telescopic section extending away from the first post, a first adjustable fastening device located at a distal end of the first telescopic section; a second adjustable fastening device located at a distal end of the second telescopic section, and a locking device to adjust the height of the second post with regards to the first post, the locking device including a clamp assembly with an adjusting knot to lock the height of the second post, a first articulation, and a second articulation to provide a right to left rotational motion and swivel motion about the first post.

3 Claims, 14 Drawing Sheets

(51) Int. Cl.

| | | |
|---|---|---|
| *F16M 13/00* | (2006.01) | |
| *F16M 11/08* | (2006.01) | |
| *F16M 11/28* | (2006.01) | |
| *H04M 1/04* | (2006.01) | |
| *F16M 13/02* | (2006.01) | |
| *A47B 23/00* | (2006.01) | |
| *A47G 23/00* | (2006.01) | |
| *A47B 23/06* | (2006.01) | |
| *F16M 11/10* | (2006.01) | |
| *A63B 71/06* | (2006.01) | |
| *F16M 11/04* | (2006.01) | |

(52) U.S. Cl.
CPC ........ *F16M 11/28* (2013.01); *A63B 2225/685* (2013.01); *F16M 11/04* (2013.01); *F16M 13/022* (2013.01); *H04M 1/04* (2013.01)

(58) Field of Classification Search
CPC . F16M 2200/06; F16M 2200/08; H04M 1/04; A63B 71/0622; A63B 71/0619; A63B 2225/685; A47B 23/06
See application file for complete search history.

(56) References Cited

U.S. PATENT DOCUMENTS

| | | | |
|---|---|---|---|
| 5,277,684 A * | 1/1994 | Harris | A63B 21/4047 482/121 |
| 5,419,747 A * | 5/1995 | Piaget | A63B 22/001 434/255 |
| 5,671,900 A | 9/1997 | Cutler | |
| 6,155,525 A | 12/2000 | Joanisse | |
| 6,439,521 B1 | 8/2002 | Wilson | |
| 2007/0034753 A1* | 2/2007 | Lee | B60R 11/0241 248/121 |
| 2015/0038300 A1* | 2/2015 | Forhan | A63B 21/156 482/72 |
| 2015/0369418 A1 | 12/2015 | Wong | |

* cited by examiner

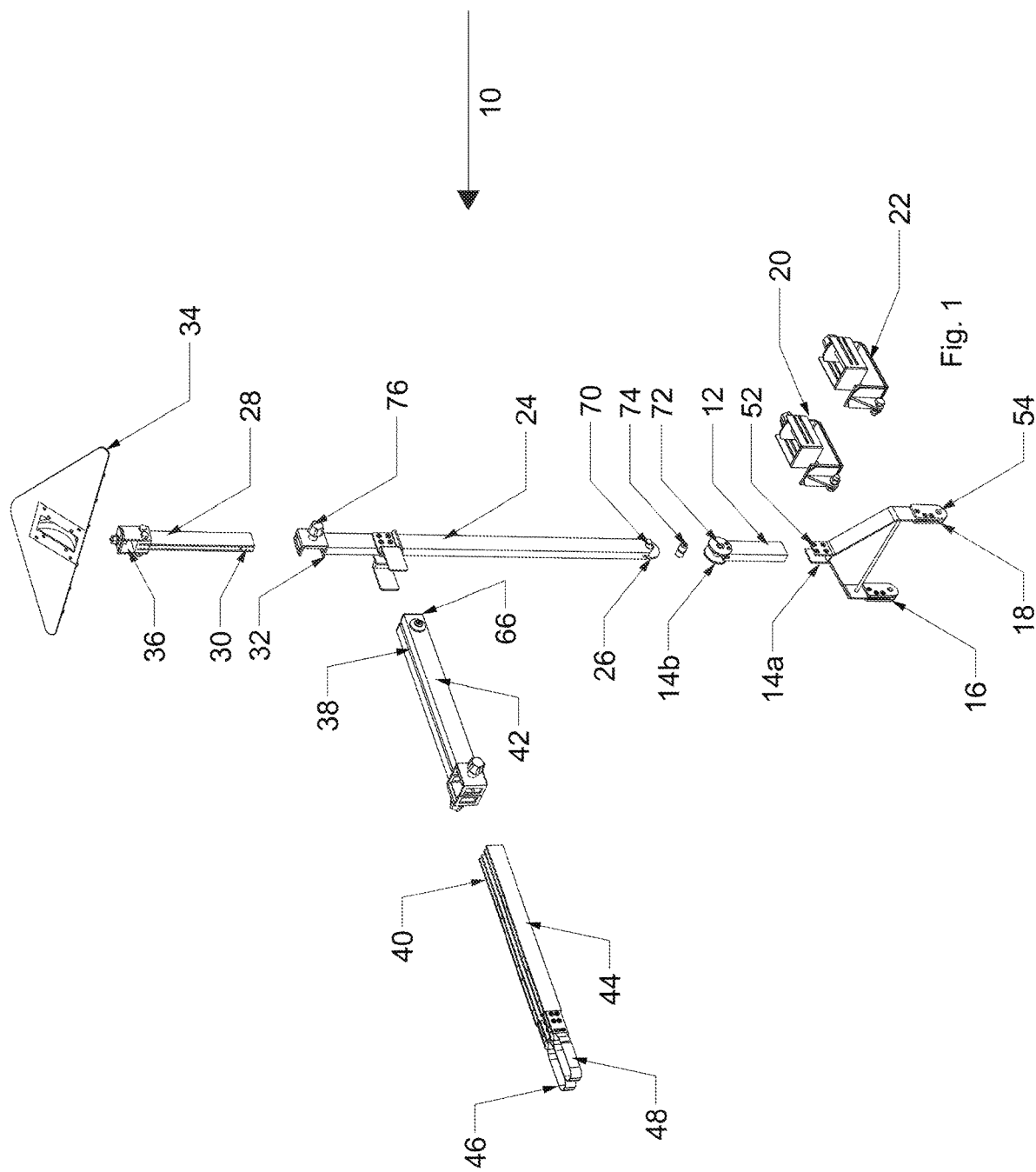

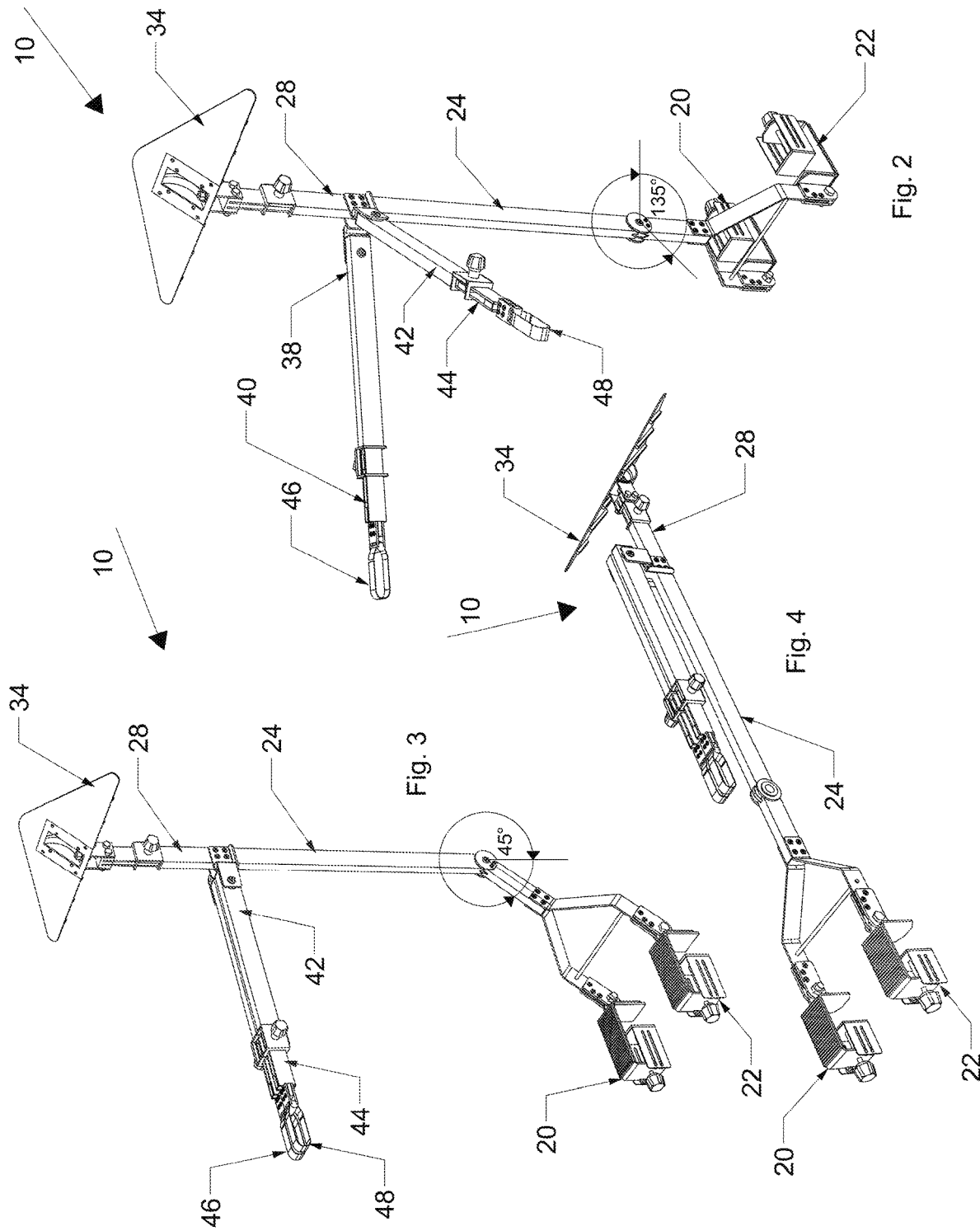

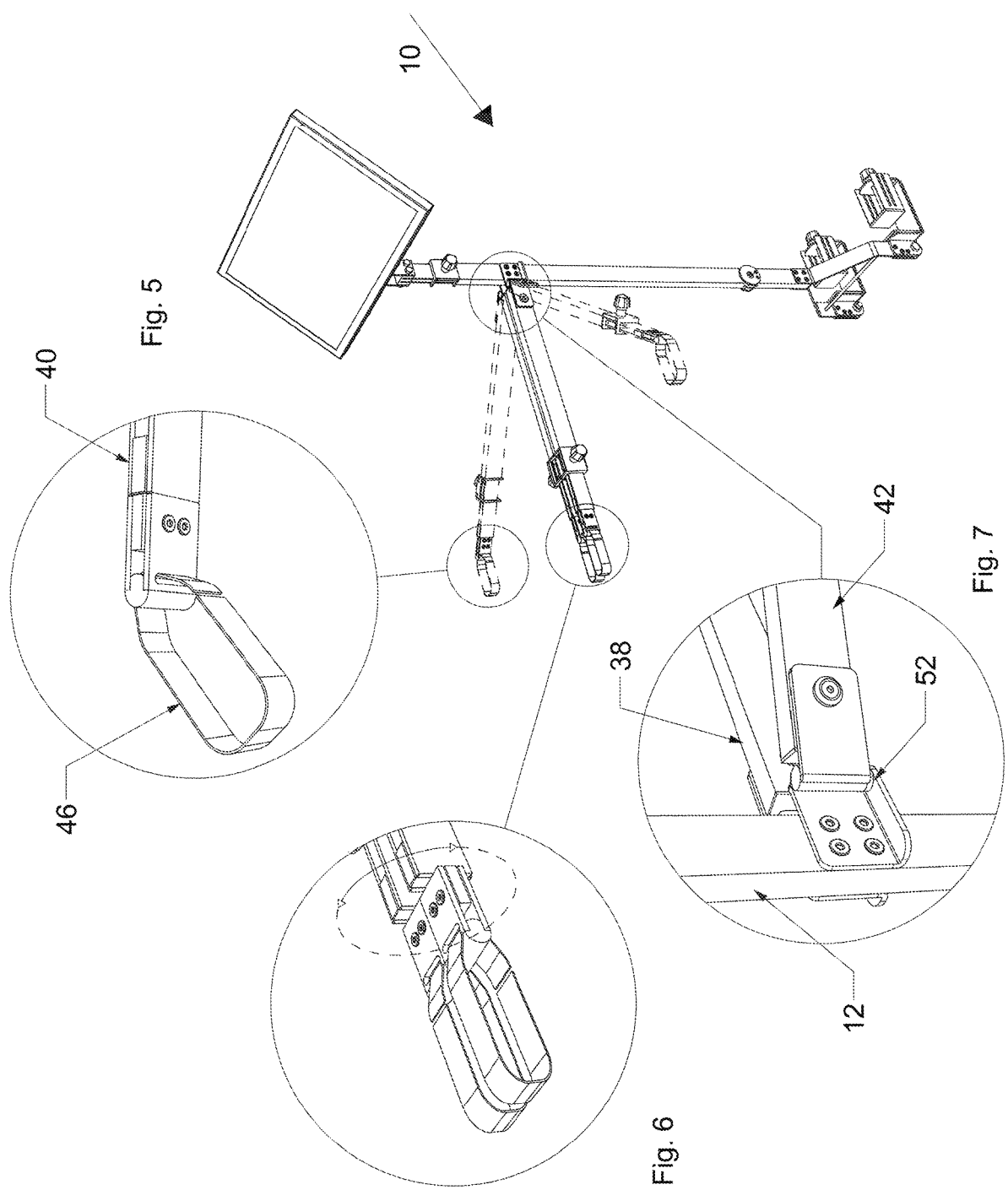

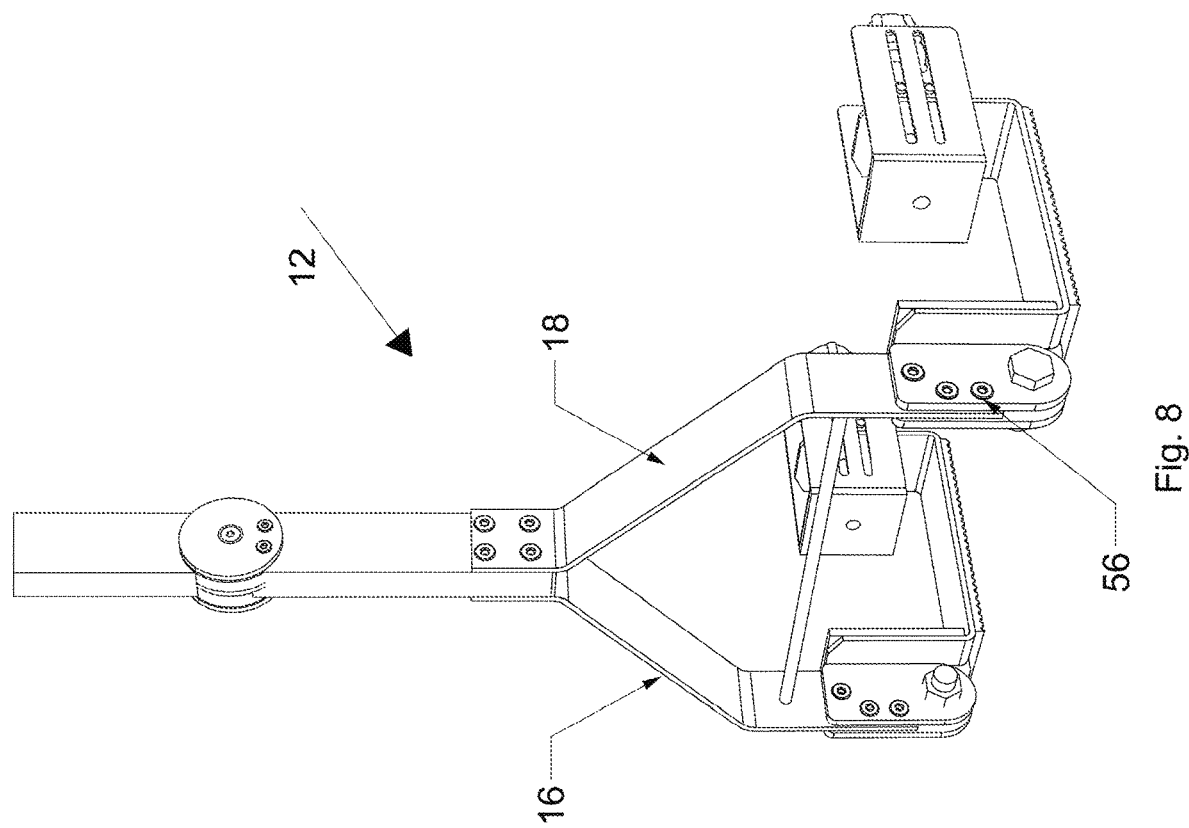

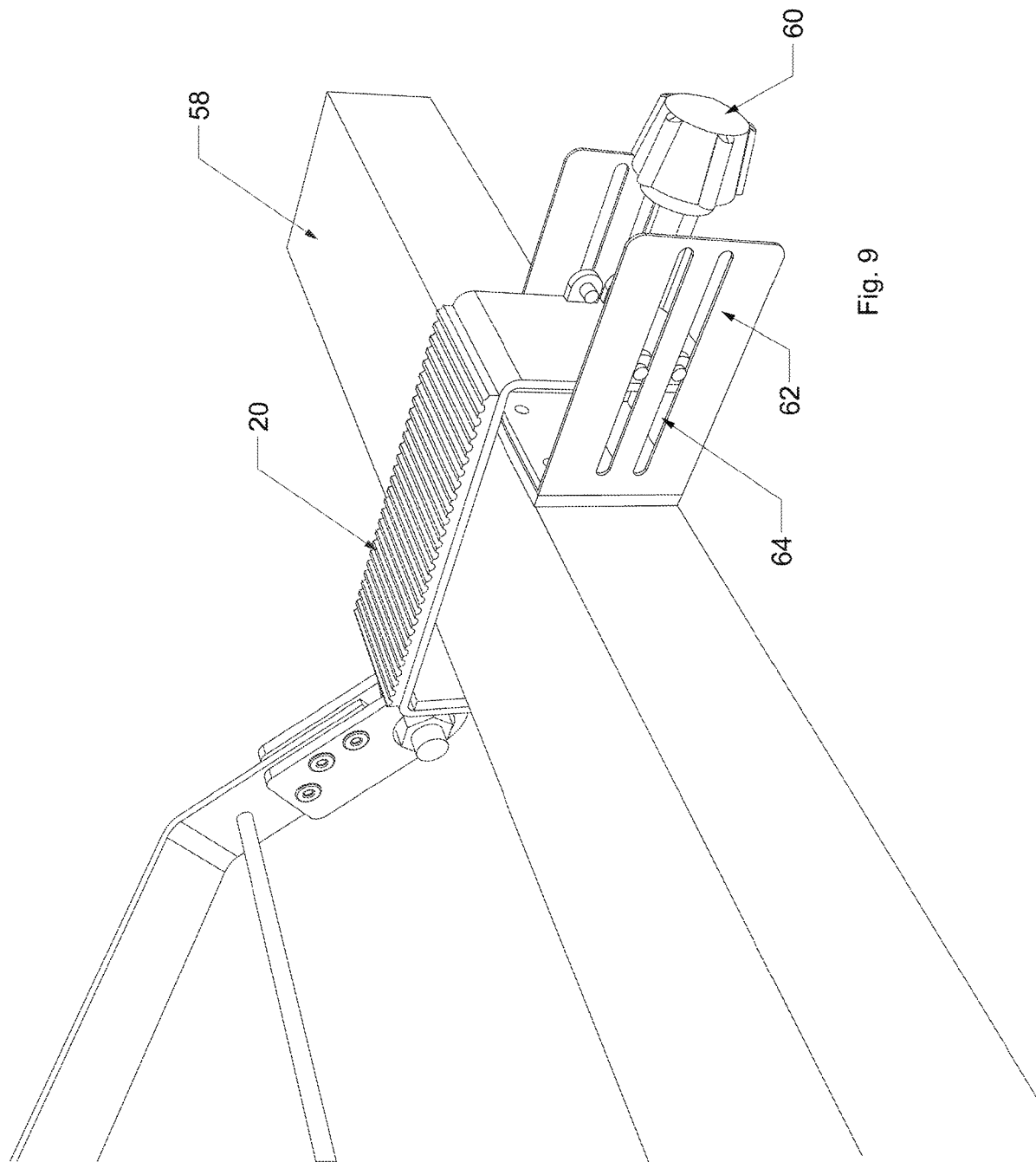

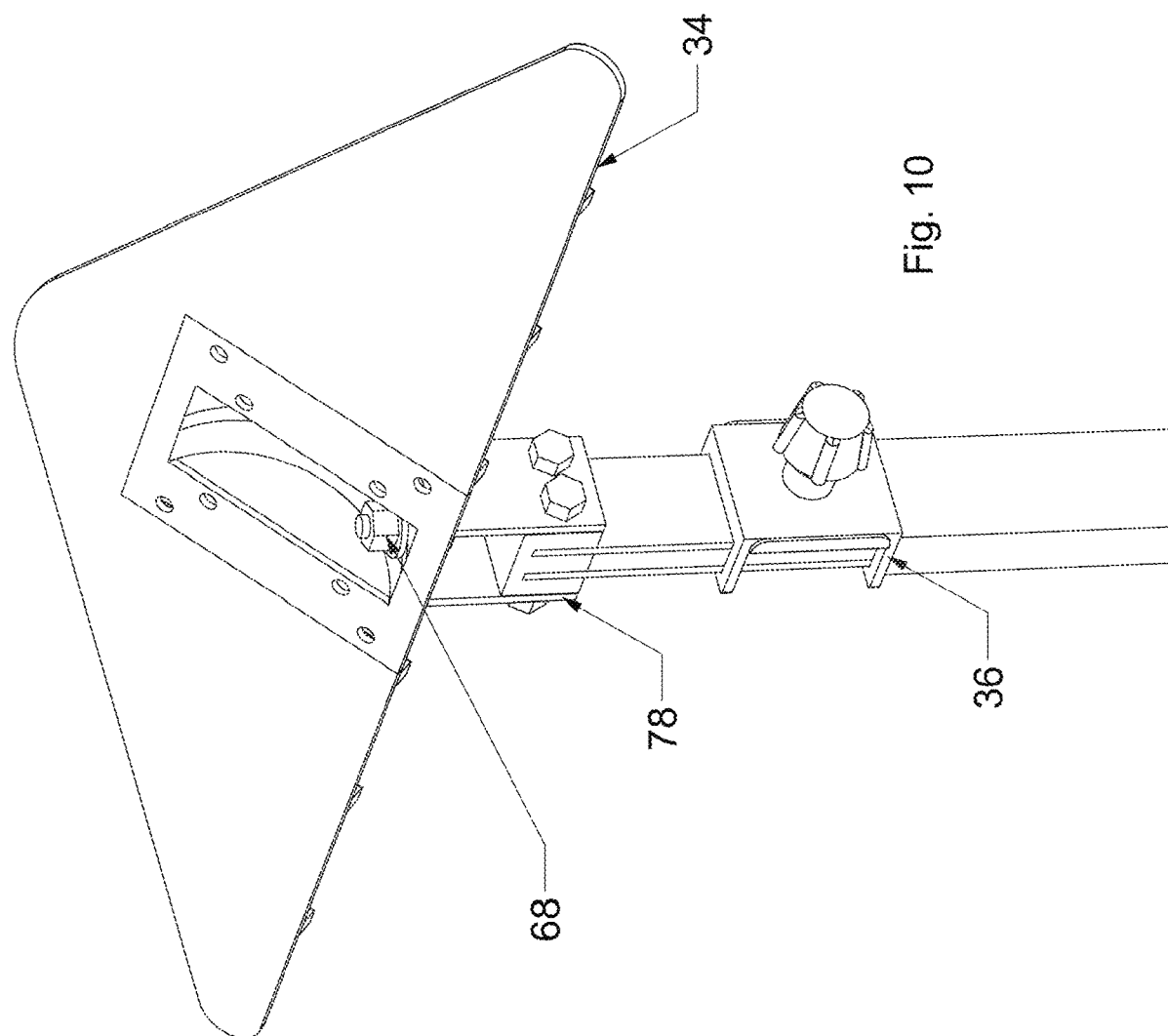

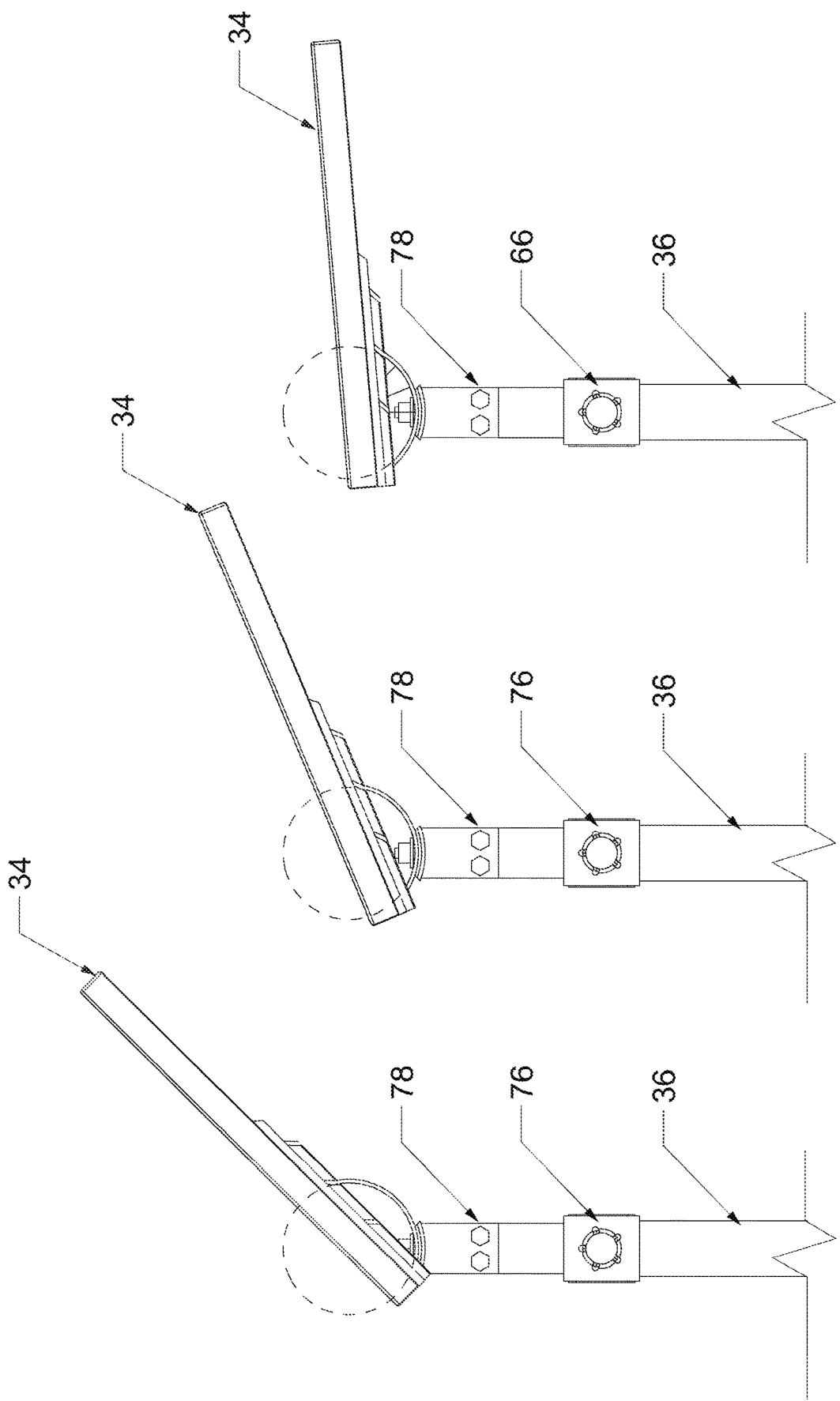

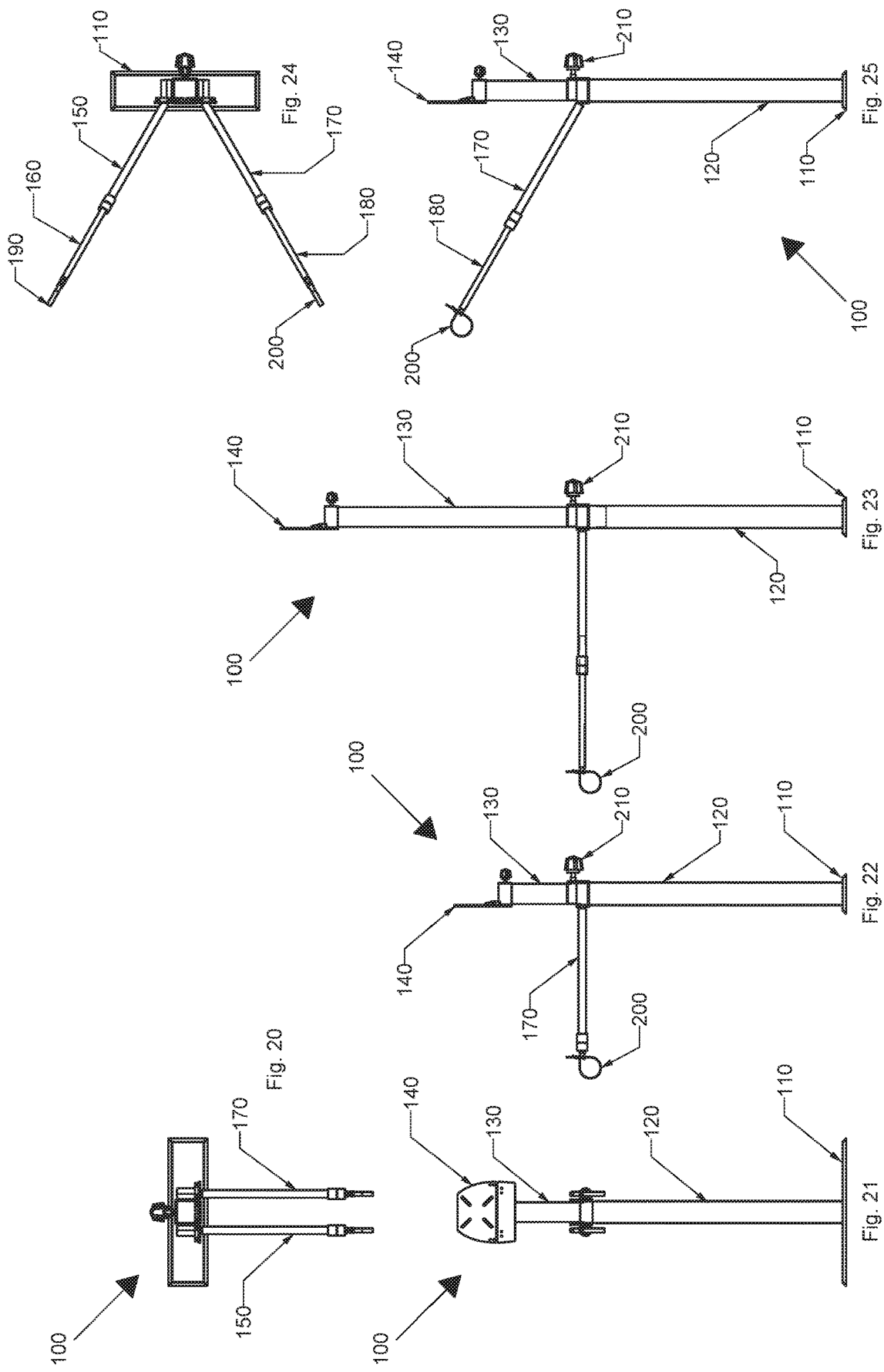

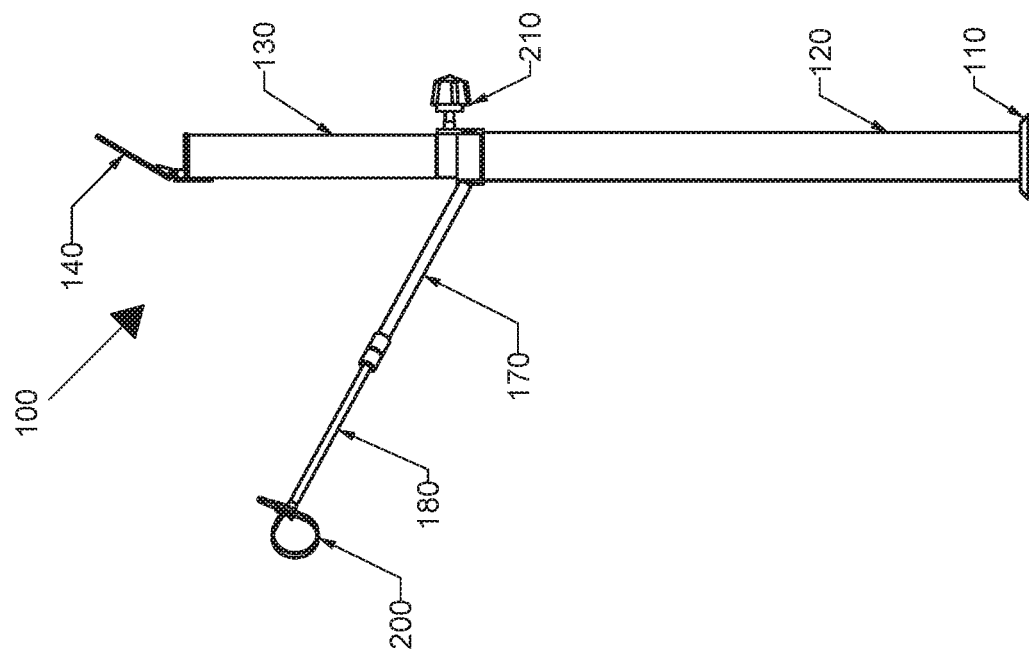
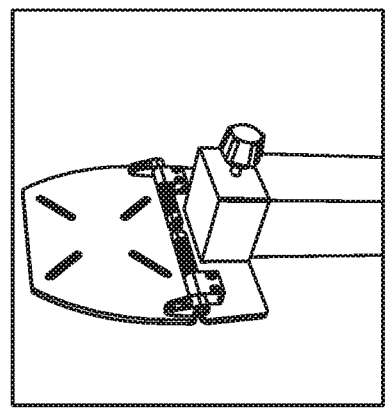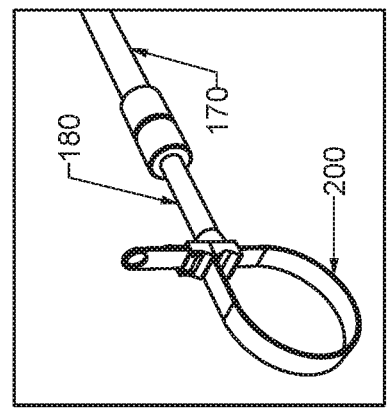
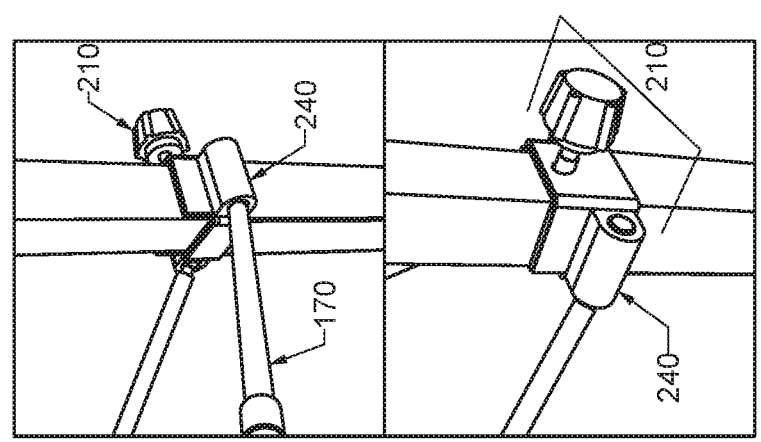

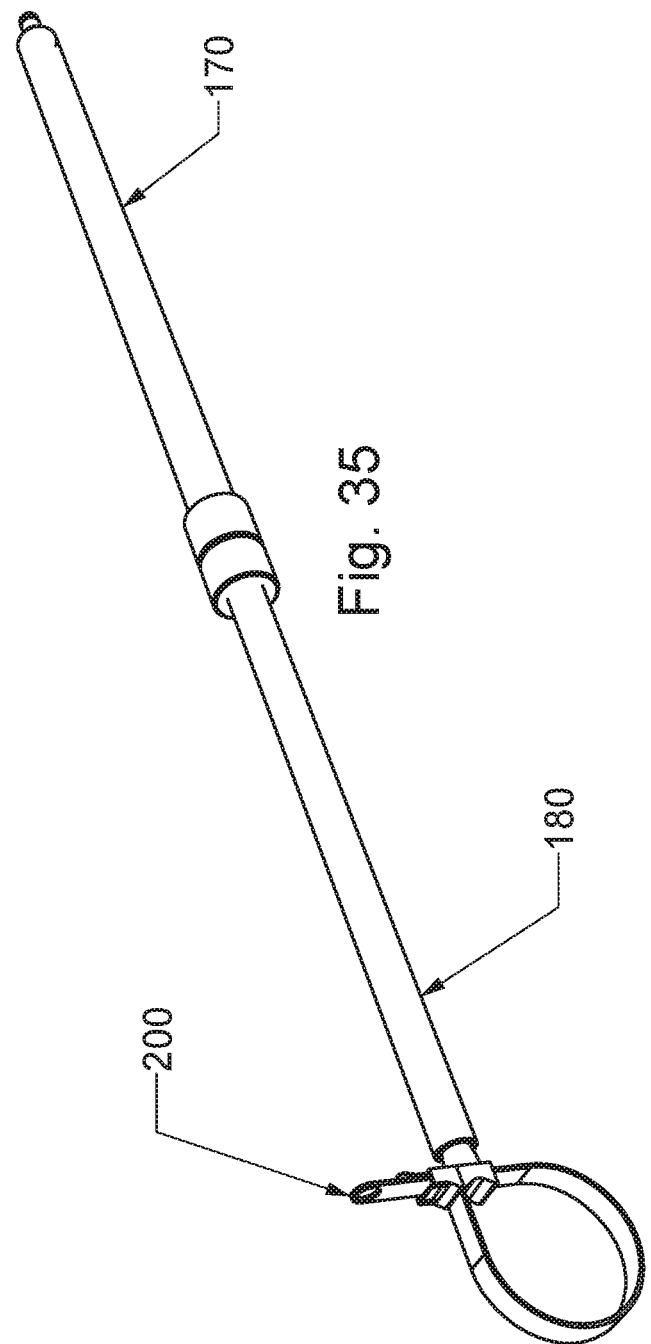

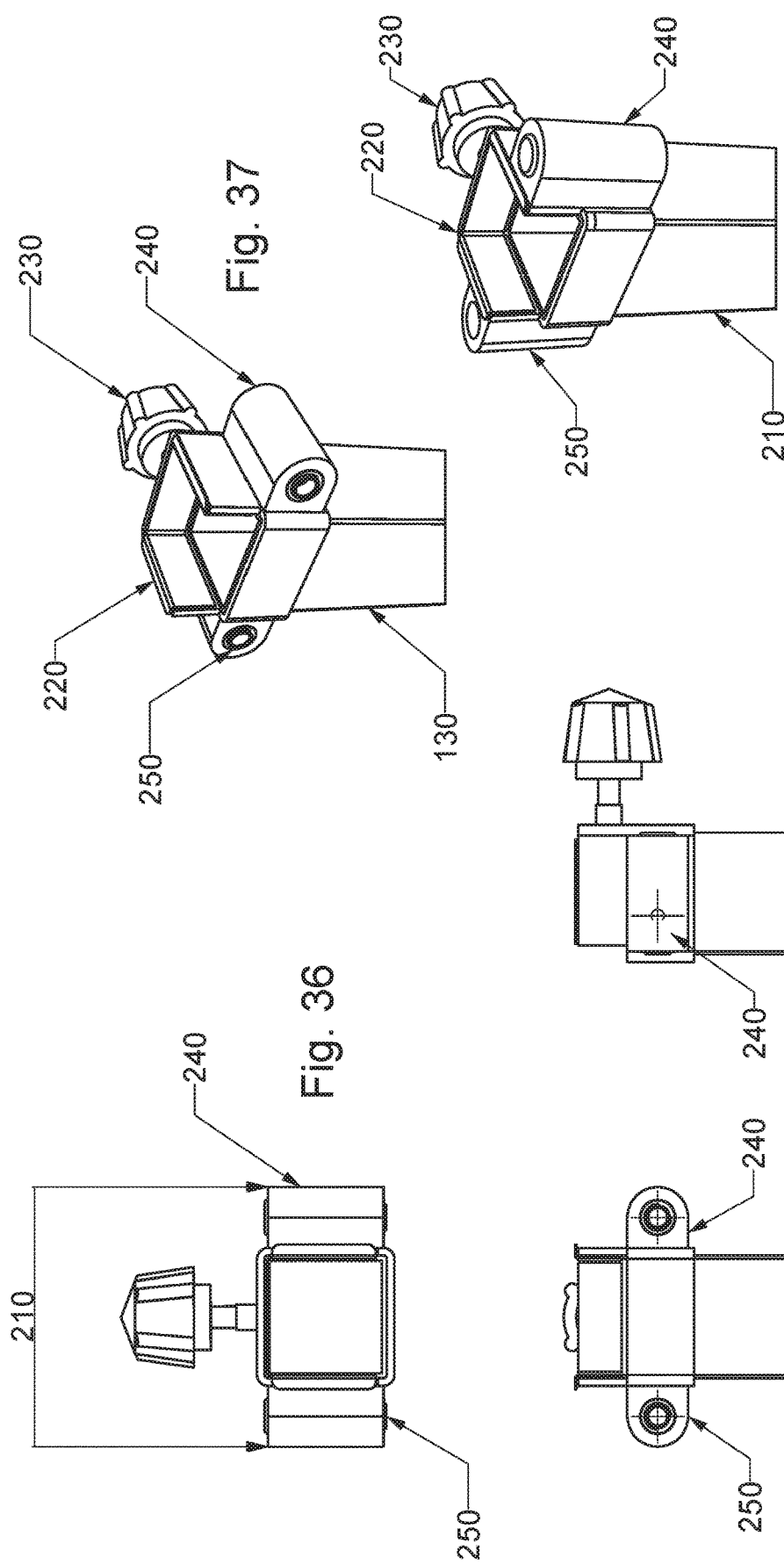

SUPPORT STAND FOR HANDS FREE USE OF ELECTRONIC DEVICES WHILE USING AN EXERCISE MACHINE

RELATED U.S. APPLICATION

This application is a continuation-in-part of U.S. application Ser. No. 16/378,972, filed Apr. 9, 2019, entitled, SUPPORT STAND FOR HANDS-FREE USE OF ELECTRONIC DEVICES WHILE USING AN EXERCISE MACHINE, allowed, the content of which is incorporated herein by reference.

FIELD OF THE INVENTION

The present invention relates to a support stand, more specifically to a support stand with leg attachments for hands-free use of electronic devices, while using an exercise machine.

BACKGROUND OF THE INVENTION

Over the years, the use of exercise machines has become a regular part of many people's lives. In addition, people rely on a TV or social media to be up to date in the latest news or friend's status. This causes an increasing trend for people that exercise to have a larger desire to be connected to a TV and/or an electronic device while exercising.

The prior art shows exercise machines provided with small shelves that can accommodate a phone, a book, or a magazine. Unfortunately, the person usually cannot read or watch clearly the information on the electronic device, since the person is often in a variety of orientations and height with respect to the shelves while using the exercise machine. It is desirable for the person to be able to comfortably watch his/her cell phone or TV or Tablet or Display monitor regardless of his/her orientation.

Usually, the gym includes several TV screens that show different shows. Unfortunately, the TV screens are located far away from the user and set to show general audience shows. In view of this, the user cannot clearly see the show or watch his/her favorite shows or the application they prefer, or any other kind of streaming service, like YouTube or smart-TV content.

The prior art also shows book-holding and computer-holding devices that are supported on the frame of the exercise machine. Unfortunately, in most of these devices the height cannot be adjusted to fit the user's height; thus, the user has trouble reading the book or looking at the computer.

In addition, the prior art shows some books or computer holders in which the height can be vertically adjusted. Unfortunately, on these devices the articles or electronic devices cannot be horizontally orientated so that the person can adequately view the articles or electronic devices.

Adjustability is an important factor in order for the person to be able to comfortably watch his/her tv, read a cell phone, electronic devices, a book, or magazine regardless of his/her orientation. Adjustability should be provided for vertical adjustment, horizontal adjustment, and angular adjustment, depending on the user who is in a wide variety of personal orientations.

SUMMARY OF THE INVENTION

The present invention relates to a support stand for an electronic device with leg attachments for hands-free use while using an exercise machine. The electronic device may be, for example, a tablet, a TV, a computer, a display monitor, or a smartphone. In another embodiment, the support stand may be used to hold a book or magazine.

The present invention relates to a support stand for an electronic device having a base having a first end and a second end, the first end including a bifurcation forming a first leg and a second leg; a first clamp pivotably attached to the first leg; a second clamp pivotably attached to the second leg; a first post having a first end pivotably connected to the second end of the base; a second post having a first end telescopically connected to a second end of the first post; a platform pivotably connected to a second end of the second post; a horizontally adjustable first arm pivotably attached to the first pole, the horizontally adjustable first arm having a first telescopic section extending away from the first pole; a horizontally adjustable second arm pivotably attached to the first pole, the horizontally adjustable second arm having a second telescopic section extending away from the first pole; a first adjustable fastening device located at a distal end of the first telescopic section; and a second adjustable fastening device located at a distal end of the second telescopic section.

In addition, the present invention discloses a support stand for an electronic device including a flat base, a first post having a first end secured to the base, a second post having a first end pivotably connected to a second end of the first post, a platform pivotably connected to a second end of the second post, a first arm pivotably attached to the first post, the first arm having a first telescopic section extending away from the first post, a second arm pivotably attached to the first post, a second arm having a second telescopic section extending away from the first post, a first adjustable fastening device located at a distal end of the first telescopic section; a second adjustable fastening device located at a distal end of the second telescopic section, and a locking device to adjust the height of the second post with regards to the first post, the locking device including a clamp assembly with an adjusting knot to lock the height of the second post, a first articulation, and a second articulation to provide a right to left rotational motion and swivel motion about the first post.

BRIEF DESCRIPTION OF THE DRAWINGS

FIG. 1 is an exploded perspective view of the preferred embodiment of the support stand according to the present invention;

FIG. 2 is a perspective view of the support stand of FIG. 1 showing the arms in a separate position;

FIG. 3 is a perspective view of the support stand of FIG. 1 showing the arms in a joined position;

FIG. 4 is a perspective view of the support stand of FIG. 1 in a folded position;

FIG. 5 is a detailed view of the support stand of FIG. 1 showing the distal end section of a single arm;

FIG. 6 is a detailed view of the support stand of FIG. 1 showing the distal end section of the two second telescopic sections of the horizontally adjustable arms when the arms are joined together;

FIG. 7 is a detailed view of the support stand of FIG. 1 showing the connection of the arms to the first post;

FIG. 8 is a perspective view of the support stand of FIG. 1 showing the legs;

FIG. 9 is a detailed view of the support stand of FIG. 1 showing the clamp on the distal end of a leg when it is secured into an object;

FIG. 10 is a detailed view of the support stand of FIG. 1 showing the platform to hold an electronic device;

FIG. 14 is a detailed view of the support stand of FIG. 1 showing the platform to hold an electronic device at a first angle with respect to the telescopic pole;

FIG. 15 is a detailed view of the support stand of FIG. 1 showing the platform to hold an electronic device at a second angle with respect to the telescopic pole;

FIG. 16 is a detailed view of the support stand of FIG. 1 showing the platform to hold an electronic device at a third angle with respect to the telescopic pole.

FIG. 20 is a top view of the support stand of FIG. 17;

FIG. 21 is a rear view of the support stand of FIG. 17;

FIG. 22 is a side view of the support stand of FIG. 17 showing the telecopy sections of the stand in a collapsed position;

FIG. 23 is a side view of the support stand of FIG. 17 showing the telecopy sections of the stand in an expanded position;

FIG. 24 is a top view of the support stand of FIG. 17 showing the horizontally adjustable arms when the arms are separated;

FIG. 25 is a side view of the support stand of FIG. 17 showing one of the horizontally adjustable arms pivoting with respect to the stand and with the stand in the collapsed position;

FIG. 26 is a detailed view of the support stand of FIG. 17 showing the platform to hold an electronic device;

FIG. 27 is a detailed perspective side view of the support stand of FIG. 17 showing the connection of the arms to the first post;

FIG. 28 is a perspective rear view of the support stand of FIG. 17 showing the connection of the arms to the first post;

FIG. 29 is a detailed view of the support stand of FIG. 17 showing the end of one of the adjustable arms;

FIG. 30 is a side view of the support stand of FIG. 17 showing one of the horizontally adjustable arms pivoting with respect to the stand and with the stand in the expanded position;

FIG. 35 shows a detailed view of one of the arms of FIG. 17;

FIG. 36 shows a top view of the support stand of FIG. 17 showing the details of the connection between the stand and the articulated arms;

FIG. 37 shows a perspective view of connection of FIG. 36 showing the connections of the arm in a horizontal position;

FIG. 38 shows a side view of connection of FIG. 36;

FIG. 39 shows a side view of connection of FIG. 36; and

FIG. 40 shows a perspective side view of connection of FIG. 36 showing the connections of the arm in a vertical position.

DETAILED DESCRIPTION OF THE INVENTION

Figure 13:
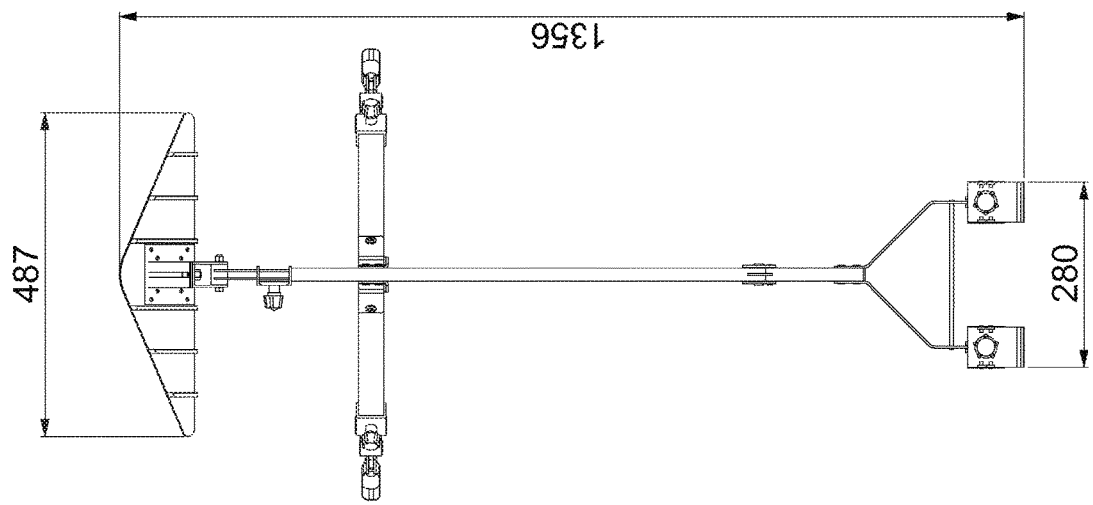
FIG. 13 is a back-side view of the support stand of FIG. 1.

FIGS. 1-4 show the support stand 10 according to the present invention. The support stand 10 includes:

a base 12 having a first end 14a and a second end 14b, the first end 14a including a bifurcation forming a first leg 16 and a second leg 18;

a first clamp 20 pivotably attached to the first leg 16;

a second clamp 22 pivotably attached to the second leg 18;

a first post 24 having a first end 26 pivotably connected to the second end 14b of the base 12;

a second post 28 having a first end 30 telescopically connected to a second end 32 of the first post 24;

a platform 34 pivotably connected to a second end 36 of the second post 28;

a horizontally adjustable first arm 38 pivotably attached to the first pole 24, the horizontally adjustable first arm 38 having a first telescopic section 40 extending away from the first pole 24;

a horizontally adjustable second arm 42 pivotably attached to the first pole 24, the horizontally adjustable second arm 42 having a second telescopic section 44 extending away from the first pole 24;

a first adjustable fastening device 46 located at a distal end of the first telescopic section 40; and a second adjustable fastening device 48 located at a distal end of the second telescopic section 50.

The components of the support stand 10 of the invention can be made from a sturdy material, for example, steel, aluminum, reinforced carbon fiber, or cured plastic. The support stand 10 may have a height between 10 inches to 10 feet, preferably between 20 inches and 7 feet.

The first post 24 has a first end 26 pivotably connected to the second end 14b of the base 12. The first end 26 includes a groove 70 that connects with a pivoting knob 72 on the second end 14b of the base and that is secured with a pin 74.

The second post 28 has a first end 30 telescopically connected to a second end 32 of the first post 24. The second post 28 slides inside the first post 24 to adjust the height of the support stand 10 by an appropriate length to accommodate the electronic device. The electronic device is held on the support stand 10 at the desired height by a locking device 76. The locking device 76 is a conventional screw clamp assembly as shown in the drawings.

The foldable position of the support stand 10 of the present invention shown in FIG. 4 is useful when the device is placed in storage or is transported from one location to another.

FIG. 5 shows the distal end section of a single arm. An adjustable fastening device 46, 48 are located at a distal end of the telescopic sections 40, 44. The adjustable fastening devices 46, 48 are adapted to be secured to the support stand 10 to a vertical or horizontal element (not shown) on a substrate, which can be a vertical or horizontal support as the fastener can rotate 90°.

The substrate may be, for example, an exercise machine such as a treadmill, exercise bike, elliptical, rowing machine, spinning equipment, or static bike. In some embodiments, the substrate may be a sofa, recliner, chair, or bed.

The adjustable fastening devices 46, 48 may be made of a material such as hook and loop (VELCRO®), buckles with size adjusting fasteners, cable ties, snaps, clips, or laces.

FIG. 6 shows the distal end section of the two second telescopic sections 40, 44 of the horizontally adjustable arms 38, 42 when the arms are joined together.

FIG. 7 shows the pivotably connection of the horizontally adjustable arms 38, 42 to the first post 24. The horizontally adjustable arms 38, 42 are connected to the first post 24 by a first shaft connection device 52. The first shaft connection device 52 may permit a right to left rotational motion swivel type rotation motion about the first post 24, as well as pivot in an up and down way.

The first shaft connection device 52 may secure to the first post 24 by any conventional means, including, but not limited to, screw securing, friction fit, or camming action.

The horizontally adjustable arms 38, 42 move independently of one another. The arms 38, 42 include fastener 66 to secure the arms 38, 42 in a final preferred location, at any point in time. The fastener may be, for example, nuts and bolts, pins, clamps, or clips.

The horizontal adjustments are made by loosening the fastener 66, adjusting the horizontally adjustable arms 38, 42 with respect to the horizontally adjustable arms 38, 42; and by retightening the fastener 66.

FIGS. 8-9 show the base 12 according to the present invention. The base 12 may be a pole, rod, or square section tube. The base 12 has the same shape as the first post 24 and the second post 28. Typically, the base 12 may have a length of between 2 to 30 inches. The base 12 includes a first end 14a and a second end 14b. The first end 14a includes a bifurcation with a first leg 16 and a second leg 18.

The first leg 16 and the second leg 18 includes holes 54 which match the holes (not shown) on the clamps 20, 22. The legs 16, 18 are secured to the clamps 20, 22 by passing nuts or screws 56 to the respective holes.

As can be seen by FIG. 9, the clamps 20, 22 are pivotably attached to the legs 16, 18. The clamps 20, 22 have a C-shape and are designed to be clamped to a horizontal element 58 of the substrate, which is ordinarily a horizontal support surface or to rest directly on the floor. The clamps 20, 22 are used for connecting the support stand 10 to the substrate. The clamps 20, 22 include in a distal end a threaded hole (not shown) through which a large threaded screw 60 protrudes. A plate 62 having a plurality of slots 64 parallel to the screw, helps the C-clamps 20, 22 to gain leverage when tightening the clamp against the horizontal element 58 of the structure. The clamps 20, 22 can be secured to the horizontal element 58 by rotation of the large threaded screw 60, which moves the distal end of the clamps 20, 22 towards the horizontal element 58.

FIGS. 10 and 14-16 show the platform 34 that holds an electronic device (not shown). Platform 34 is pivotably connected to a second end 36 of the second post 28. The platform 34 may have any geometrical shape, for example, square, rectangular, triangular, or circular.

Platform 34 may tilt between 0 to 90-degree angles with respect to the second post 28. The platform 34 is fastened to the second post 28 by a swivel head 78 which maximizes the ability of the platform 34 to assume any of a variety of positions/angles. In one embodiment, the platform 34 may include a connector 68 to allow a user to electrically connect a TV onto the platform 34.

Figure 12:
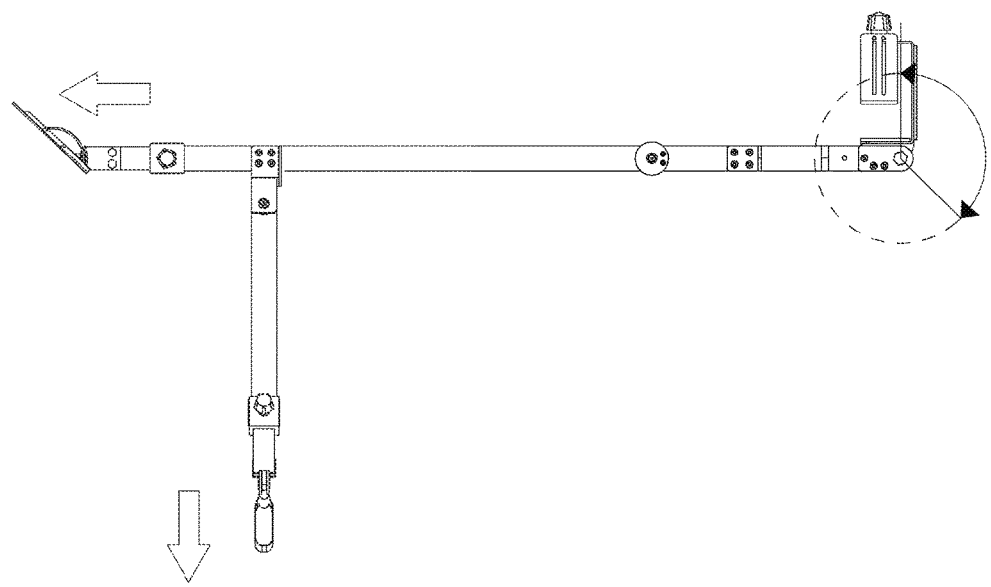
FIG. 12 is a side view of the support stand of FIG. 1 showing a leg in a third position.
Figure 11:
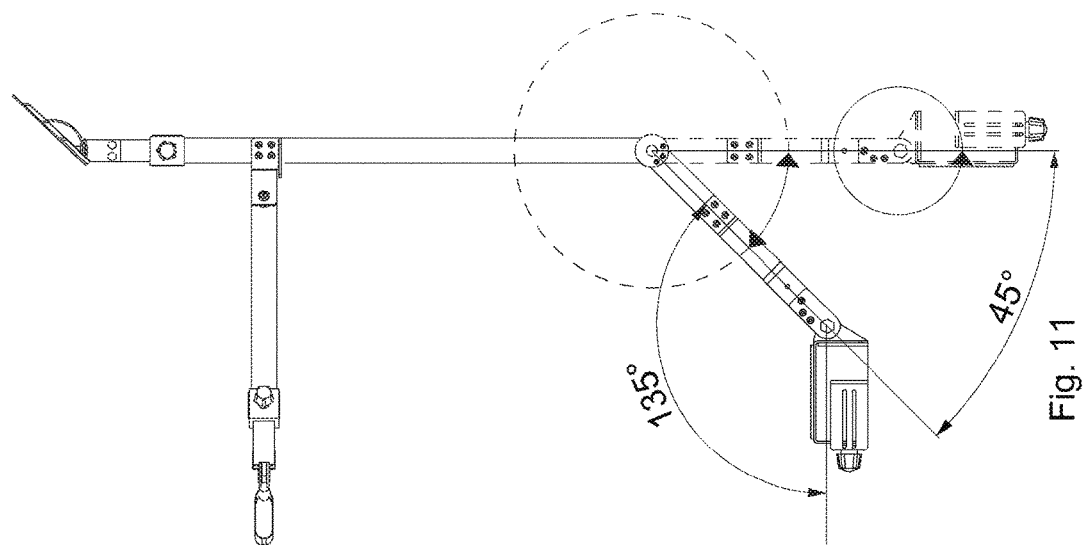
FIG. 11 is a side view of the support stand of FIG. 1 showing a leg pivoting from a first position to a second position.
Figure 19:
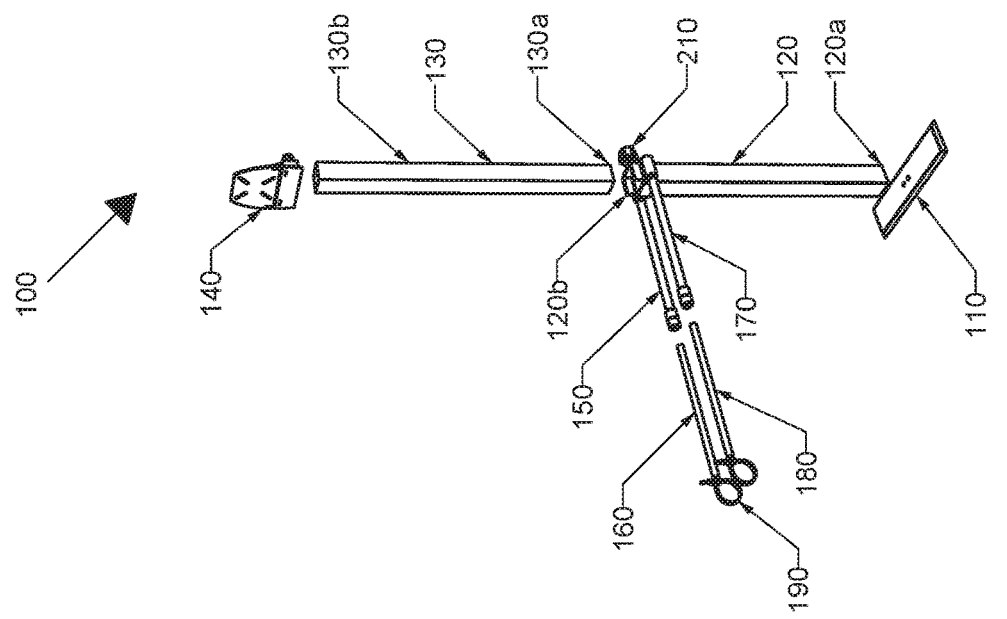
FIG. 19 is an exploded view of the support stand of FIG. 17.
Figure 17:
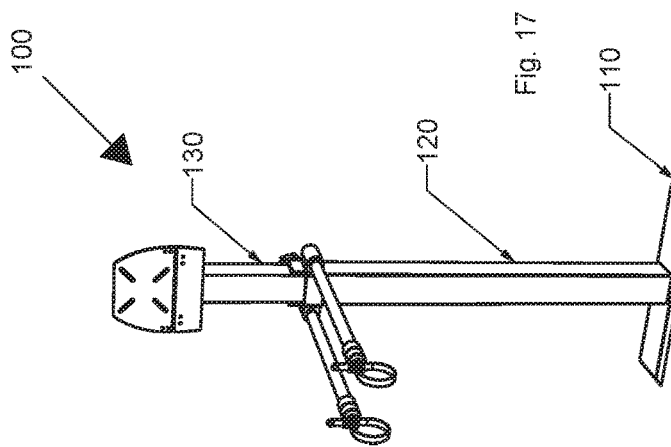
FIG. 17 shows a perspective front view of another preferred embodiment of the support stand according to the present invention.

FIG. 11 shows the support stand having a leg pivoting from a first position to a second position to adjust to the exercise machine or to rest on the floor. FIG. 12 shows the support stand having a leg in a third position to rest directly on the floor.

In an embodiment of the invention, a small dimensions model may be provided that is designed to be used on a bed frame, a tabletop, or chair.

In an embodiment, the support stand 10 may include speakers (not shown) and/or lights mounted to the first post 24.

The support stand 10 may be placed in front of the substrate (exercise machine, etc.). Then, the adjustable fastening devices 46, 48 are secured to a vertical support element on the substrate. In addition, the clamps 20, 22 are secured to the horizontal support element 58 of the substrate. Then, the person riding the exercise machine selects a comfortable vertical and horizontal position or orientation by: sliding the second post 28 within the first pole 24 to adjust the height; moving horizontally the adjustable arms 38, 42; sliding the telescopic section 40, 44 within the adjustable arms 38, 42 to adjust the distance to the user; and/or tilting the platform 34 to the right angle.

The present invention provides a support stand that permits the user to use an electronic device in a hands-free manner while the person is using an exercise machine.

It should be understood that the above description is intended for illustrative purposes only, and is not intended to limit the scope of the present invention in any way.

FIGS. 17-40 show the support stand 100 according to another embodiment of the present invention. The support stand 100 includes:

a flat base 110;

a first post 120 having a first end 120a secured to the flat base 110;

a second post 130 having a first end 130a pivotably connected to a second end 120b of the first post 120;

a platform 140 pivotably connected to a second end 130b of the second post 130;

a first arm 150 pivotably attached to the first post 120, the first arm 150 having a first telescopic section 160 extending away from the first post 120;

a second arm 170 pivotably attached to the first post 120, second arm 170 having a second telescopic section 180 extending away from the first post 120;

a first adjustable fastening device 190 located at a distal end of the first telescopic section 160; and a second adjustable fastening device 200 located at a distal end of the second telescopic section 180.

The components of the support stand 100 according to an embodiment of the invention can be made from a sturdy material, for example, steel, aluminum, reinforced carbon fiber, or cured plastic. The support stand 100 may have a height between 10 inches to 10 feet, preferably between 20 inches and 7 feet.

The flat base 110 may have any geometrical shape. In one embodiment, the base 110 may have a circular, square, triangular, hexagonal, or octagonal shape. Typically, the base 110 may have a length of between 1 to 30 inches.

The first post 120 has a first end 120a connected to the flat base 110. The first post 120 is connected to the flat base 110 by using any standard method, for example; nails, screws, bolts, welding, snap on, or pressure.

The first post 120 may have any geometrical shape. In one embodiment, the first post 120 may have a circular, square, triangular, hexagonal, or octagonal shape.

The first post 120 may have a height between 5 inches to 50 inches, preferably between 20 inches and 40 inches.

The second post 130 has the same shape as the first post 120. The second post 130 has a first end 130a telescopically connected to a second end 120b of the first post 120. The second post 130 slides inside the first post 120 to adjust the height of the support stand 100 by an appropriate length to accommodate the electronic device.

The second post 130 is held secure on the first post 120 at the desired height by a locking device 210.

The locking device 210 may secure to the first post 120 by any conventional means, including, but not limited to, screw securing, friction fit, or camming action.

The locking device 210 includes:

a clamp assembly 220 with an adjusting knot 230 to lock the height of the second post 130;

a first articulation 240 and a second articulation 250 to provide a right to left rotational motion swivel type rotation motion about the first post 24, as well as pivot in an up and down direction.

In one embodiment, the articulations 240, 250 may include a one-piece arm having a sphere at its end that embedded into a capsule allowing the arm to move in all directions.

In one embodiment, the articulations 240, 250 may include a first piece that allows the up and down movement of the arm and a second piece that allows the horizontal movement of the arm.

The first arm 150 has a first end connected to a first articulation 240. The second arm 170 has a first connected to the second articulation 250. The arms 150, 170 move independently of one another.

The horizontal and vertical movements may be up 90 degrees on each direction.

Figure 18:
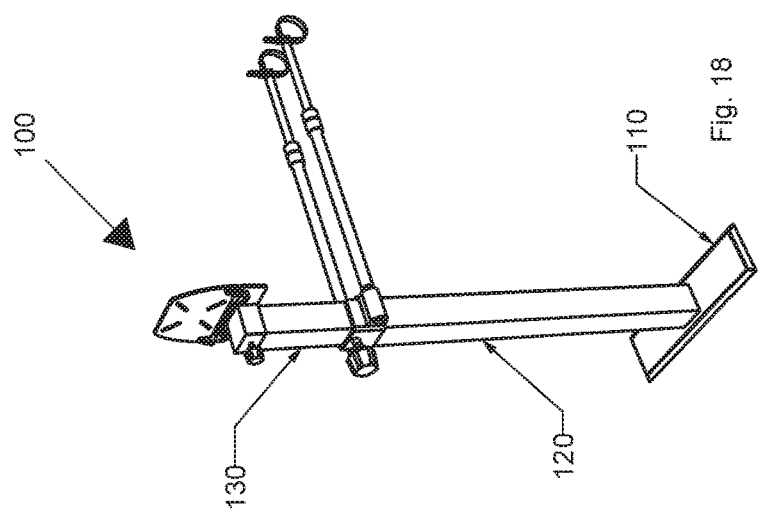
FIG. 18 is a perspective side view of the support stand of FIG. 17.
Figure 31:
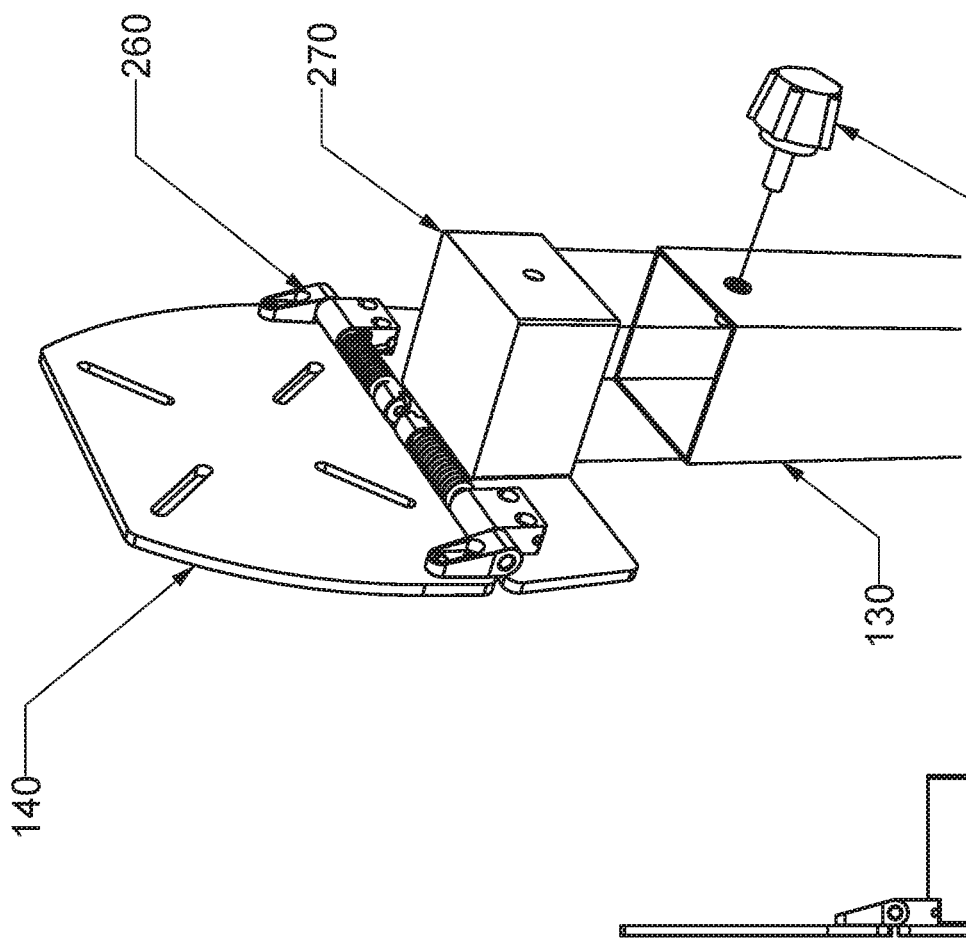
FIG. 31 is a detailed view of the support stand of FIG. 17 showing the platform to hold an electronic device.
Figure 33:
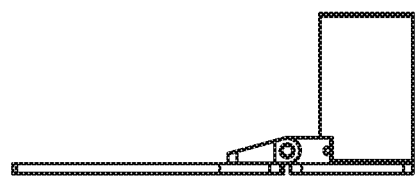
FIG. 33 is a side view of the platform of FIG. 32.
Figure 34:
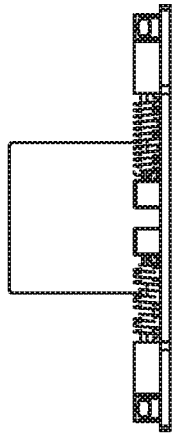
FIG. 34 is a top view of the platform of FIG. 32.
Figure 32:
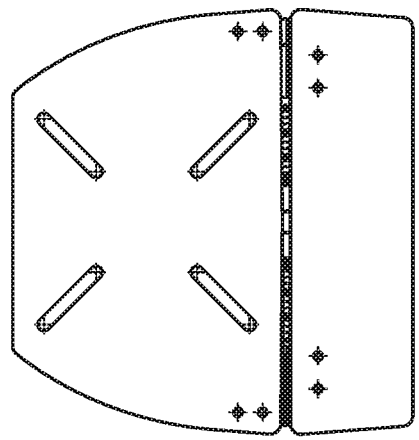
FIG. 32 is a rear view of the support stand of FIG. 17 showing the platform to hold the electronic device.

The foldable position of the support stand 100 according to one embodiment of the present invention shown in FIG. 18 is useful when the device is placed in storage or is transported from one location to another.

FIG. 35 shows the distal end section 160, 180 of a single arm 150, 170. An adjustable fastening device 190, 200 are located at a distal end of the telescopic sections 160, 180. The adjustable fastening devices 190, 200 are adapted to be secured to the support stand 100 to a vertical or horizontal element (not shown) on a substrate, which can be a vertical or horizontal support on the gym equipment as the fastener can rotate 360°.

The substrate may be, for example, an exercise machine such as a treadmill, exercise bike, elliptical, rowing machine, spinning equipment, or static bike. In some embodiments, the substrate may be a sofa, recliner, chair, or bed.

The adjustable fastening devices 190, 200 may be made of a material such as plastic, elastic bands, hook and loop (VELCRO®), buckles with size adjusting fasteners, cable ties, snaps, clips, laces, or any type of adjustment.

FIGS. 31-34 show the platform 140 that holds an electronic device (not shown). Platform 140 is pivotably connected to a second end 130b of the second post 130. The platform 140 may have any geometrical shape, for example, square, rectangular, triangular, or circular.

Platform 140 may tilt between 0 to 90-degree angles with respect to the second post 130. The platform 140 is fastened to the second post 130 by a weighted hinge 260. The weighted hinge 260 pivots over an axis and is able to maintain the desire tilt position by a mechanism of springs and adjustment butterflies, which maximizes the ability of the platform 140 to assume any of a variety of positions/angles.

The platform 140 is connected to the second post 130 by using, for example, a cap 270 including an adjusting knot 280, by snap on mechanism, or by pressure.

In one embodiment, the platform 140 may include a connector (not shown) to allow a user to electrically connect a TV onto the platform 140.

In an embodiment of the invention, a small dimensions model may be provided that is designed to be used on a bed frame, a tabletop, or chair.

In an embodiment, the support stand 10 may include speakers (not shown) and/or lights mounted to the first post 24.

The support stand 10 may be placed in front of the substrate (exercise machine, etc.). Then, the adjustable fastening devices 46, 48 are secured to a vertical support element on the substrate. In addition, the clamps 20, 22 are secured to the horizontal support element 58 of the substrate. Then, the person riding the exercise machine selects a comfortable vertical and horizontal position or orientation by: sliding the second post 28 within the first pole 24 to adjust the height; moving horizontally the adjustable arms 38, 42; sliding the telescopic section 40, 44 within the adjustable arms 38, 42 to adjust the distance to the user; and/or tilting the platform 34 to the right angle.

The present invention provides a support stand that permits the user to use an electronic device in a hands-free manner while the person is using an exercise machine.

It should be understood that the above description is intended for illustrative purposes only, and is not intended to limit the scope of the present invention in any way.

The invention claimed is:

1. A support stand for an electronic device comprising:
a flat base;
a first post having a first end secured to the flat base;
a second post having a first end pivotably connected to a second end of the first post;
a platform pivotably connected to a second end of the second post;
a first arm pivotably attached to the first post, the first arm having a first telescopic section extending away from the first post;
a second arm pivotably attached to the first post, second arm having a second telescopic section extending away from the first post;
a first adjustable fastening device located at a distal end of the first telescopic section;
a second adjustable fastening device located at a distal end of the second telescopic section; and
a locking device to adjust the height of the second post with regards to the first post, the locking device including a clamp assembly with an adjusting knot to lock the height of the second post, a first articulation, and a second articulation to provide a right to left rotational motion and swivel motion about the first post.

2. The support stand according to claim 1, wherein the first arm and the second arm move independently of one another.

3. The support stand according to claim 1, wherein the adjustable fastening devices are adapted to be secured to a vertical support on the exercise machine.

* * * * *